Oct. 14, 1941.  F. K. SCHOENFELD ET AL  2,259,180
METHOD FOR CONTINUOUS POLYMERIZATION
Filed Oct. 27, 1938
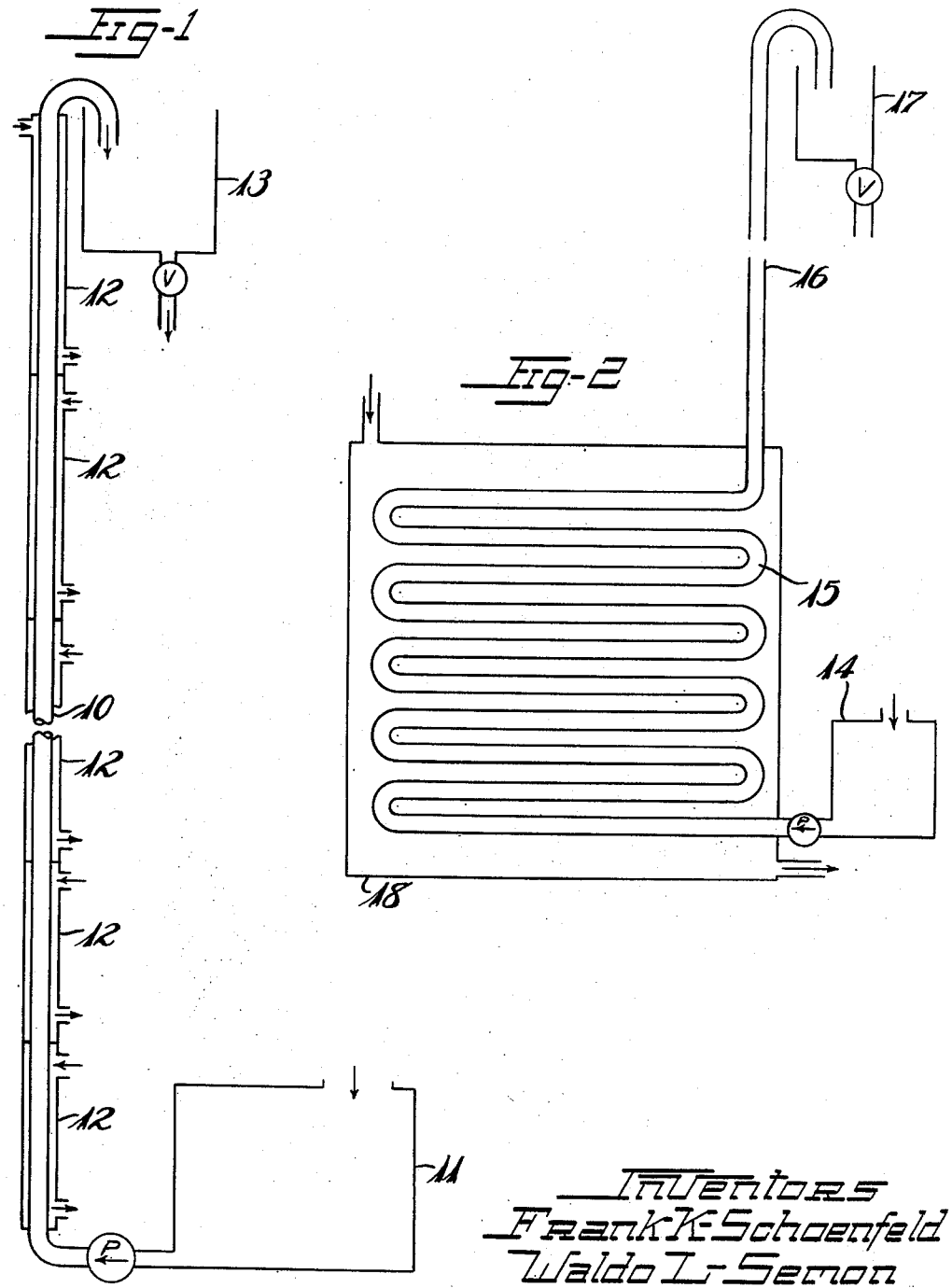
INVENTORS
Frank K. Schoenfeld
Waldo L. Semon
By Willis F. Avery
Atty.

Patented Oct. 14, 1941

2,259,180

UNITED STATES PATENT OFFICE 2,259,180

METHOD FOR CONTINUOUS POLYMERIZATION

Frank K. Schoenfeld and Waldo L. Semon, Silver Lake, Ohio, assignors to The B. F. Goodrich Company, New York, N. Y., a corporation of New York Application October 27, 1938, Serial No. 237,242

4 Claims. (Cl. 260—32)

This invention relates to the formation of polymeric products, and has as its principal object to provide a method whereby volatile monomers may be continuously polymerized.

Heretofore, gases such as vinyl chloride and butadiene 1,3 and volatile liquids such as isoprene have usually been polymerized in closed vessels by a batch process. When different temperatures were desired at different stages of the polymerization, expensive cooling or heating mechanisms were often required to produce the required temperature changes in sufficiently short spaces of time.

By the method of this invention, volatile monomers are polymerized while dispersed in a liquid medium in an open reactor in which the hydraulic pressure at any point is greater than the vapor pressure of the charge being continuously delivered at that point in the reactor. Since the rate at which the charge passes through the reaction zone is slow, the hydraulic pressure at any point in the reactor will depend mainly upon the frictional resistance and the height of the reactor.

The invention may be better understood by referring to the accompanying drawing, of which Fig. 1 represents a tall reactor open to the atmosphere at the delivering end, and Fig. 2 represents a reactor in which the charge must travel a tortuous path, which reactor is also open to the atmosphere at the delivering end.

The simplest form of reactor which may be used is simply a tall open tube 10 made of glass, stainless steel, lead, or other suitable material. The emulsion to be polymerized is delivered to a storage tank 11 and pumped into the reactor. The reactor is surrounded by the temperature regulating means 12 which is preferably divided in sections to allow different sections of the tube to be kept at different temperatures. In the present embodiment, the temperature is regulated by circulating fluid around the reactor, but any other desired means may be employed. The reactor is open to the atmosphere at the delivering end, and the polymer is run into the storage vessel 13.

The height of the reactor depends upon the particular monomer polymerized and the temperature of the polymerization. For the polymerization of an emulsion consisting of 200 parts by weight of vinyl chloride, 1 part of benzoyl peroxide, 3 parts of an emulsifying agent such as the sodium salt of isopropyl naphthalene sulfonic acid, and 300 parts of water, for instance, a reactor such as that shown in Fig. 1 has to be approximately 150 feet high when the polymerization is accomplished at 40° C. The charge is run through the column at such a rate that any portion of the charge requires 24 hours to reach the top.

It is often desirable to perform different stages of the polymerization at different temperatures. Thus the temperature of the lower sixth of a tall reacting column may be maintained at 60° C. and reduced to 40° C. for the upper part of the column. Vinyl chloride may be polymerized under such conditions to give excellent yields of the gamma polymer. A column of the same height may be used for the polymerization of monomers having different vapor pressures than vinyl chloride by regulation of the temperature to produce any desired vapor pressure at any point in the column.

The height of the reactor may be decreased if the frictional resistance is increased. Thus, the charge may be run through a long tube which frequently changes its direction as in Fig. 2. The emulsion is stored in the vessel 14. If desired, the entire polymerization may be completed in the tube 15 containing many sharp bends or spirals so that the charge follows a tortuous path, and the completely polymerized charge may then be run through an open vertical tube 16 of sufficient height to prevent the vaporization of the charge at any point in the bent portion of the reactor, and collected in the vessel 17. The tube 15 is surrounded by a temperature regulating means, which in this embodiment consists of the chamber 18 through which fluid of the desired temperature may be circulated. The reactor may also contain baffles or other obstructions to increase the frictional resistance. As another modification, the reactor may be an open helical tube of uniform diameter. Many other possible modifications which may be necessary to adapt the reactor to the polymerization of different volatile monomers will readily suggest themselves to those skilled in the art.

The charge to be polymerized by the method of this invention consists of an emulsion of a volatile monomer in a liquid vehicle. Emulsions of vinyl chloride, vinyl bromide, but..diene, and isoprene may be readily polymerized by this continuous method. This invention is also applicable to charges containing relatively non-volatile monomer along with the volatile monomers, typical examples being methyl methacrylate and vinyl chloride emulsified in water, butadiene and styrene emulsified in water, butadiene and acrylonitrile emulsified in glycerol, etc. Catalysts, plasticizers, stabilizers, dispersion aids, pigments, modifying agents and other materials ordinarily used in batch polymerizations may also be used in the continuous process of this invention. The use of these additional materials will be illustrated with reference to vinyl chloride, though it is to be understood that similar materials suited to the particular monomer to be polymerized may be employed in all cases.

In a preferred form of this invention, vinyl chloride is dispersed in water and polymerized as previously described. The polymerization is catalyzed by per-compounds in general, including peroxides such as hydrogen peroxide, calcium peroxide, barium peroxide, and benzoyl peroxide, per-acids such as per-sulfuric acid and per-salts such as the per-borates, per-carbonates, per-phosphates, etc.

Any of the well-known emulsifying, dispersing, and wetting agents may be used, typical examples being the salts of the higher alkyl sulfates, particularly those containing from 12 to 18 carbon atoms such as sodium lauryl sulfate, the salts of alkyl naphthalene sulfonic acids such as sodium isopropyl naphthalene sulfonate, soaps such as sodium oleate and potassium stearate, glue, glycerol laurate, etc.

It is often desirable to add some material to increase the viscosity of the dispersion medium and thereby retard the settling of the polymerized materials, such as starch or cellulose methyl ether.

Suitable plasticizers which may be included in the batch include tricresyl phosphate, butyl phthalyl butyl glycollate, tetrahydrofurfuryl laurate, dimethyl thianthrene, etc. By selection of a suitable stabilizing plasticizer such as tetrahydrofurfuryl laurate or by adding a basic stabilizer, heat- and light-stable polymers may be produced.

After reaching the top of the reactor, the batch may be discharged into a flash vessel from which any unpolymerized vinyl chloride may be recovered by compression or condensation. The dispersion may be diluted with water to lower the viscosity and the polymer may be separated by coagulation, settling, filtering, or centrifuging.

Although we have herein disclosed specific embodiments of our invention, we do not intend to limit ourselves solely thereto, for it will be obvious to those skilled in the art that many modifications in the structure of the tall open reactor and in the particular monomers employed are within the spirit and scope of the invention as defined in the appended claims.

We claim:

1. The method which comprises polymerizing an aqueous dispersion of vinyl chloride in a tall open reactor in which the hydraulic pressure at any point is greater than the vapor pressure of the charge being continuously delivered at that point in the reactor.

2. The method of polymerizing a monomer so volatile that its vapor pressure at the temperature at which the polymerization is being effected exceeds atmospheric pressure, which comprises passing a dispersion of the monomer in a liquid medium at a temperature above the boiling point of the monomer through an open reactor in which the hydraulic pressure at any point is greater than the vapor pressure of the charge being continuously delivered at that point in the reactor.

3. The method of polymerizing a monomer so volatile that its vapor pressure at the temperature at which the polymerization is being effected exceeds atmospheric pressure, which comprises passing a dispersion of the monomer in a liquid medium at a temperature above the boiling point of the monomer through an open vertical reactor of such height that the hydraulic pressure at any point is greater than the vapor pressure of the charge being continuously delivered at that point in the reactor.

4. The method of polymerizing a monomer so volatile that its vapor pressure at the temperature at which the polymerization is being effected exceeds atmospheric pressure, which comprises passing a dispersion of the monomer in a liquid medium at a temperature above the boiling point of the monomer through a tubular reactor open at the discharge end and bent so that the moving charge follows a tortuous path during at least the first part of the polymerization, the hydraulic pressure at any point in the reactor being greater than the vapor pressure of the charge being continuously delivered at that point.

FRANK K. SCHOENFELD.
WALDO L. SEMON.